United States Patent
Sugisaki et al.

(10) Patent No.: US 8,369,777 B2
(45) Date of Patent: Feb. 5, 2013

(54) COMMUNICATION APPARATUS, PROGRAM, COMMUNICATION METHOD AND COMMUNICATION SYSTEM

(75) Inventors: Eiko Sugisaki, Kanagawa (JP); Natsuko Kinoshita, Tokyo (JP); Jun Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 12/500,079

(22) Filed: Jul. 9, 2009

(65) Prior Publication Data

US 2010/0048132 A1 Feb. 25, 2010

(30) Foreign Application Priority Data

Aug. 25, 2008 (JP) ................................. 2008-215844

(51) Int. Cl.
*H04B 5/00* (2006.01)
(52) U.S. Cl. ...................................... 455/41.1; 455/410
(58) Field of Classification Search .................. 455/410, 455/41.1, 41.2, 41.3, 67.11, 88, 552.1
See application file for complete search history.

(56) References Cited

U.S. PATENT DOCUMENTS

2008/0132167 A1 * 6/2008 Bent et al. .................... 455/41.2

FOREIGN PATENT DOCUMENTS

| JP | 2006-228129 | 8/2006 |
| JP | 2006-340170 | 12/2006 |

* cited by examiner

*Primary Examiner* — Ping Hsieh
(74) *Attorney, Agent, or Firm* — Oblon, Spivak, McClelland, Maier & Neustadt, L.L.P.

(57) ABSTRACT

A communication apparatus including a first communication unit for communicating with other communication apparatus through electric field coupling or magnetic field coupling, an approach detection unit for detecting an approach between the other communication apparatus and the first communication unit, and a selection unit for, when the other communication apparatus and the first communication unit are separated from each other, selecting different data to be transmitted depending on a time for which the other communication apparatus and the first communication unit were in close proximity to each other.

9 Claims, 10 Drawing Sheets

COMMUNICATION APPARATUS, PROGRAM, COMMUNICATION METHOD AND COMMUNICATION SYSTEM

BACKGROUND OF THE INVENTION

1. Field of the Invention

The present invention relates to a communication apparatus, a program, a communication method and a communication system.

2. Description of the Related Art

In recent years, there has been broadly used a radio wave communication system prescribed in the IEEE (Institute of Electrical and Electronic Engineers) 802.11. The radio wave communication system is configured such that an antenna is used to transmit and receive a wireless radio wave, but the wireless radio wave interferes with a radio wave transmitted or received therearound, which may affect the communication.

There is proposed a short distance wireless communication system which uses electric field coupling or magnetic field coupling to make communication other than the radio wave communication system. In the short distance wireless communication system, for example, when a plurality of communication apparatuses for performing magnetic field coupling approach, the communication apparatuses magnetically couple so that a communication is realized between the communication apparatuses through magnetic field coupling. In this manner, according to the short distance wireless communication system utilizing electric field coupling or magnetic field coupling, since a signal is not transmitted if a communication party does not approach, an issue for the interference is difficult to occur, which is more advantageous than the radio wave communication system.

There is assumed such that a content server such as music distribution device transmits music data to an approached communication apparatus as one usage of such a short distance wireless communication system. Japanese Patent Application Laid-Open No. 2006-340170 Publication discloses therein a method for transmitting data being reproduced in one apparatus to the other apparatus.

SUMMARY OF THE INVENTION

However, it was complicated for a user having a communication apparatus to input transmission-requested music data or to select whether to view or purchase the same on a touch panel or operation buttons of a music distribution device. There is assumed that a spatial motion of the communication apparatus is detected to realize the inputting on the music distribution device, but there is an issue that hardware for measuring an acceleration or tilt has to be installed in the communication apparatus.

The present invention has been therefore made in terms of the above issues and it is desirable to provide a novel and improved communication apparatus, a program, a communication method and a communication system capable of selecting data to be transmitted with an easier structure.

According to an embodiment of the present invention, there is provided a communication apparatus including: a first communication unit for communicating with other communication apparatus through electric field coupling or magnetic field coupling; an approach detection unit for detecting an approach between the other communication apparatus and the first communication unit; and a selection unit for, when the other communication apparatus and the first communication unit are separated from each other, selecting different data to be transmitted depending on a time for which the other communication apparatus and the first communication unit were in close proximity to each other.

The selection unit may select first data to be transmitted when a time for which the other communication apparatus and the first communication unit were in close proximity to each other is shorter than a setting time, and select second data partially containing the first data to be transmitted when the time for which the other communication apparatus and the first communication unit were in close proximity to each other is longer than the setting time.

The first communication unit may periodically transmit a signal, and when the other communication apparatus and the first communication unit were in close proximity to each other, receive a response to the signal from the other communication apparatus. The approach detection unit may count the number of times the first communication unit continuously receives the response, and the selection unit may select data depending on the number of times counted by the approach detection unit.

The first communication unit may receive a signal periodically transmitted from the other communication apparatus, the approach detection unit may count the number of times the first communication unit continuously receives the response, and the selection unit may select data depending on the number of times counted by the approach detection unit.

When the other communication apparatus and the first communication unit approach each other again after the other communication apparatus and the first communication unit are separated from each other and when a time for which the other communication apparatus and the first communication unit are being separated from each other is within a predetermined time, the first communication unit may transmit the data selected by the selection unit.

The communication apparatus may further include a second communication unit, and the data selected by the selection unit may be transmitted from the second communication unit.

According to another embodiment of the present invention, there is provided a program for causing a computer to function as: a communication unit for communicating with other communication apparatus through electric field coupling or magnetic field coupling; an approach detection unit for detecting an approach between the other communication apparatus and the communication unit; and a selection unit for, when the other communication apparatus and the communication unit are separated from each other, selecting different data to be transmitted depending on a time for which the other communication apparatus and the communication unit were in close proximity to each other.

According to another embodiment of the present invention, there is provided a communication method including the steps of: detecting an approach with other communication apparatus communicating through electric field coupling or magnetic field coupling; detecting a separation from the other communication apparatus; and selecting different data to be transmitted depending on a time for which the other communication apparatus is in close proximity.

According to another embodiment of the present invention, there is provided a communication system including: a first communication apparatus; and a second communication apparatus having: a communication unit for communicating with the first communication apparatus through electric field coupling or magnetic field coupling; an approach detection unit for detecting an approach between the first communication apparatus and the communication unit; and a selection unit for, when the first communication apparatus and the communication unit are separated from each other, selecting different data to be transmitted depending on a time for which the first communication apparatus and the communication unit were in close proximity to each other.

According to the embodiments of the present invention described above, it is possible to select data to be transmitted with an easier structure.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"Detailed Description of the Preferred Embodiments" will be described according to the following item order.
(1) First Embodiment
   (1-1) Outline of first embodiment
   (1-2) Structure of content server
   (1-3) Operation of first embodiment
(2) Second embodiment
(3) Third embodiment
(4) Supplement (1) First Embodiment (1-1) Outline of First Embodiment An outline of a communication system 1 according to a first embodiment of the present invention will be described first with reference to FIG. 1.

Figure 1:
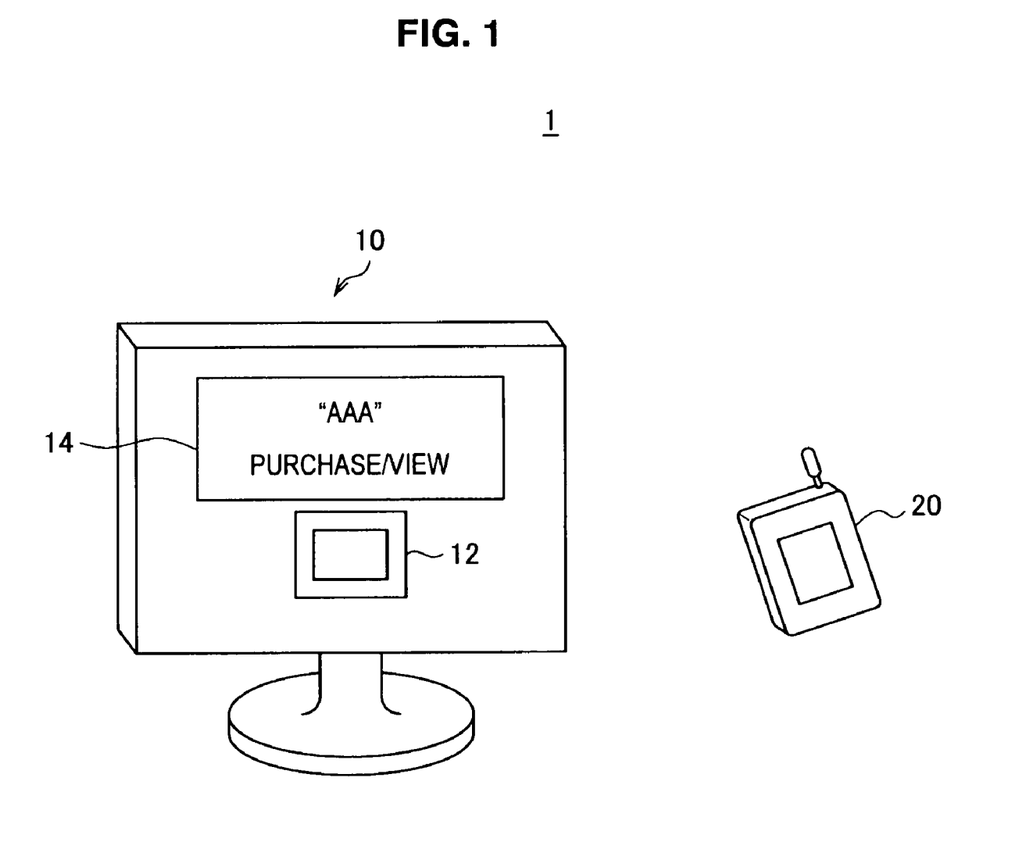
FIG. 1 is an explanatory diagram showing a communication system according to a first embodiment.

FIG. 1 is an explanatory diagram showing the communication system 1 according to the first embodiment of the present invention. As shown in FIG. 1, the communication system 1 according to the present embodiment includes a content server 10 and a cell phone 20.

The content server 10 stores therein content data or is connected to a content data storage device via a communication network to provide services such as viewing and selling of the content data.

The content server 10 and the cell phone 20 include an electrode plate called electric field coupler capable of electric field coupling with each other. For example, when an electric field coupler is provided inside a coupler position display 12 of the content server 10 and both the electric field couplers of the content server 10 and the cell phone 20 approach each other within 3 cm, a change in an inductive field generated by one electric field coupler is sensed by the other electric field coupler, thereby realizing an electric field communication between the content server 10 and the cell phone 20.

Specifically, in a pair of devices for making the above electric field communication, one of the pair functions as an initiator and the other functions as a responder. The initiator is directed for making a connection establishment request and the responder is directed for receiving the connection establishment request from the initiator.

For example, when the content server 10 shown in FIG. 1 functions as an initiator and the cell phone 20 functions as a responder, if the cell phone 20 and the content server 10 approach each other, a connection establishment request transmitted from the content server 10 is received by the cell phone 20. Then, when the connection establishment request is received by the cell phone 20, the cell phone 20 and the content server 10 perform an authentication processing as one example of the connection establishment processing, and when the authentication processing is normally terminated, the cell phone 20 and the content server 10 are connected to a data communicable state. The authentication processing includes, for example, a confirmation as to whether software versions or emulation systems indicating protocol are coincided between the cell phone 20 and the content server 10.

Thereafter, the cell phone 20 and the content server 10 make data communication in one-to-one. For example, the content server 10 transmits view data or sell data of contents "AAA" displayed on a display unit 14 to the cell phone 20. The content server 10 according to the present embodiment, as detailed later, can select which to transmit the view data or the sell data depending on a time for which the cell phone 20 is in close proximity thereto. The content data includes music data such as music, lecture and radio program, video data such as cinema, TV program, video program, photographs, documents, pictures and graphics, or games and software.

Since a radio wave emitted from an antenna attenuates in reverse proportion to the square of the distance and the intensity of the inductive field occurring from the electric field coupler is reversely proportional to the fourth power of the distance, the distance between a pair of communication apparatuses capable of electric field communication can be advantageously restricted. In other words, effects can be obtained that there will be less deterioration in a signal due to surrounding obstacles in the electric field communication and a technique for preventing hacking or securing confidential can be simplified.

A radio wave emitted from an antenna has a transverse wave component oscillating in a direction orthogonal to the wave traveling direction and a polarized wave is present therein. To the contrary, since the electric field coupler generates an inductive electric field having a longitudinal wave component oscillating in the traveling direction and having no polarized wave, if the faces of the pair of electric field couplers are opposed to each other, a signal can be conveniently received at the reception side.

In the present specification, there will be described with emphasis an example in which a pair of communication apparatuses such as the content server 10 and the cell phone 20 utilizes an electric field coupler to make short distance wireless communication (non-contact communication), but the present invention is not limited to the example. For example, a pair of communication apparatuses can also make short distance wireless communication via a communication unit capable of communication through magnetic field coupling.

Further, the content server 10 and the cell phone 20 are merely shown as one example of the communication apparatus in FIG. 1, and the present invention is not limited to the example. For example, the communication apparatus may be an information processing device such as PC (Personal Computer), home video processing device (such as DVD recorder or video cassette recorder), PHS (Personal Handyphone System), portable music player, portable video processing device, PDA (Personal Digital Assistants), home game device, portable game device or household electrical appliance.

(1-2) Structure of Content Server

A structure of the content server 10 according to the present embodiment will be described below with reference to FIG. 2.

Figure 2:
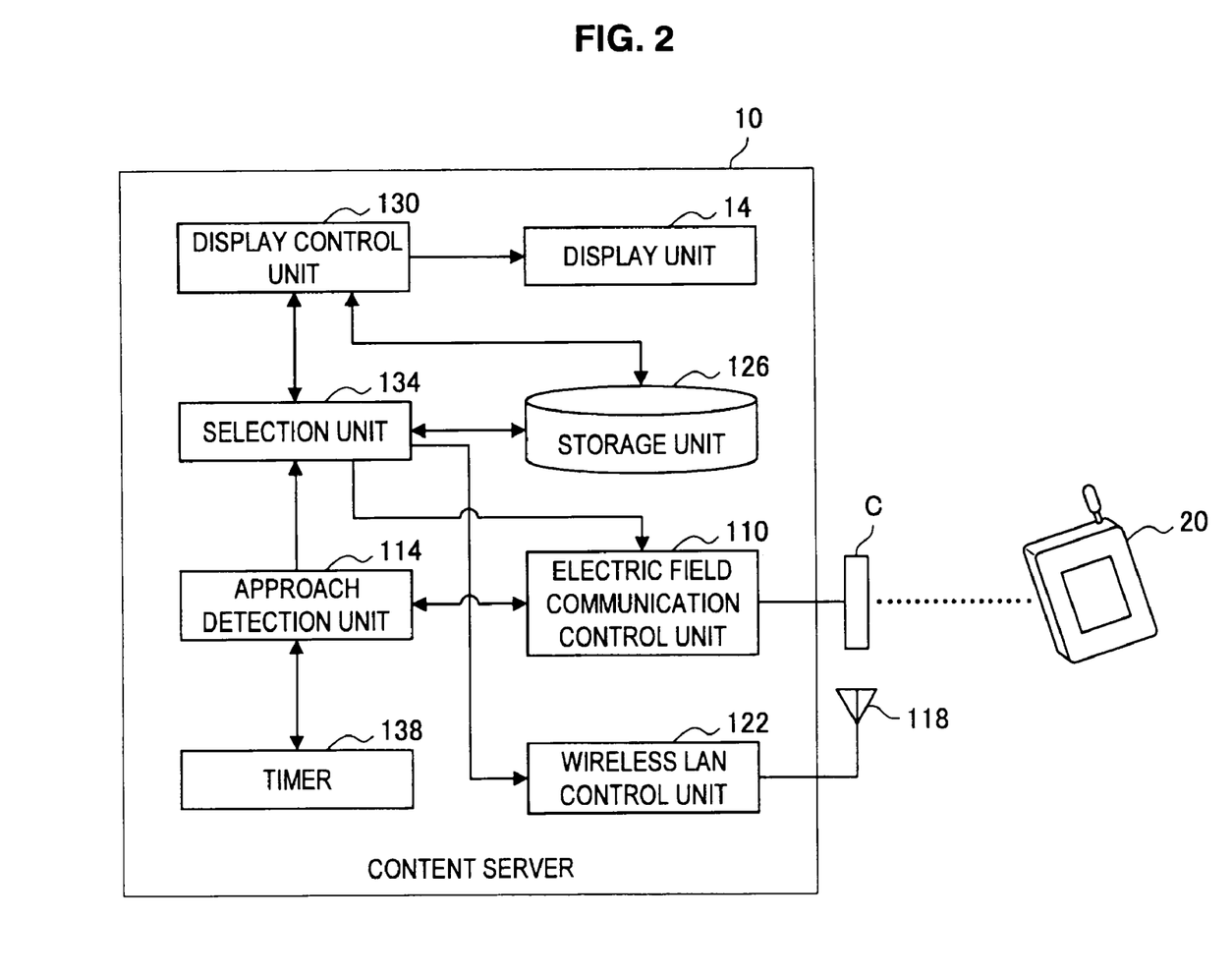
FIG. 2 is a functional block diagram showing a structure of a content server according to the first embodiment.

FIG. 2 is a functional block diagram showing the structure of the content server 10 according to the first embodiment. As shown in FIG. 2, the content server 10 includes an electric field coupler C, a display unit 14, an electric field communication control unit 110, an approach detection unit 114, an antenna 118, a wireless LAN control unit 122, a storage unit 126, a display control unit 130, a selection unit 134 and a timer 138.

The field coupler C functions as a communication unit (first communication unit) for making communication through electric field coupling with an electric field coupler of an approached communication apparatus as explained in "[1-1] Outline of first embodiment".

The electric field communication control unit 110 entirely controls the electric field communication between the electric field coupler C and the cell phone 20. For example, the electric field communication control unit 110 generates and converts connection data for the connection establishment processing into a signal form transmittable from the electric field coupler C. Further, the electric field communication control unit 110 converts data selected by the selection unit 134 into a signal form transmittable from the electric field coupler C. Furthermore, the electric field communication control unit 110 decodes the data received by the electric field coupler C. For example, the electric field communication control unit 110 may down-convert the data received by the electric field coupler C as a high frequency signal into a baseband signal and obtain a bit string based on a constellation.

The approach detection unit 114 detects an approach and a separation between the electric field coupler C and the cell phone 20. More specifically, when a connection between the content server 10 and the cell phone 20 is established, the approach detection unit 114 transmits count data taking a predetermined transmission time (for example, one second) from the electric field coupler C. Then, the approach detection unit 114 detects a reception of ACK (response) to the count data from the cell phone 20 as an approach between the content server 10 and the cell phone 20. On the other hand, the approach detection unit 114 detects an absence of the ACK reception as a separation between the content server 10 and the cell phone 20.

The approach detection unit 114 counts the number of times of ACK reception while the ACK for the count data is being received. Since the approach detection unit 114 has transmitted the count data taking a predetermined transmission time, if the ACK reception is absent, a time for which the content server 10 and the cell phone 20 were in close proximity to each other can be evaluated on the basis of the counted number of times of ACK reception. For example, when the transmission time for the count data takes one second and the number of times of ACK reception is 3 times, if the ACK transmission time is ignored, the approach detection unit 114 evaluates that the content server 10 and the cell phone 20 were in close proximity to each other for 3 seconds (1 second×3 times). More generally, when the transmission time of the count data is assumed as T seconds and the number of times of ACK reception is assumed as N times, the approach detection unit 114 evaluates that the content server 10 and the cell phone 20 were in close proximity to each other for T×N seconds.

There has been described above the example in which the approach detection unit 114 uses the count data taking a predetermined transmission time to evaluate the approach time, but the present embodiment is not limited to the example. For example, the approach detection unit 114 can evaluate the approach time even by controlling the field electric communication control unit 110 to periodically transmit predetermined data from the electric field coupler C.

The antenna 118 functions as a communication unit (second communication unit) for exchanging a radio wave of a wireless LAN (Local Area Network) with the cell phone 20, for example. The wireless LAN control unit 122 entirely controls to make communication with the cell phone 20 through the wireless LAN via the antenna 118. FIG. 2 merely shows the wireless LAN as one example of a communication form different from the electric field communication, and the content server 10 may include any structure for infrared communication or Bluetooth (trademark) communication.

The storage unit 126 stores therein one or more items of content data. The storage unit 126 may store therein, for the same contents, entire data (second data) of the contents for selling and partial data (first data) of the contents for viewing. The storage unit 126 may be a recording medium such as non-volatile memory, magnetic disk, optical disk and MO (Magneto Optical) disk. The non-volatile memory may include EEPROM (Electrically Erasable Programmable Read-Only Memory) and EPROM (Erasable Programmable ROM), for example. The magnetic disk may include a hard disk and disk-shaped magnetic disk. The optical disk may include CD (Compact Disk), DVD-R (Digital Versatile Disc Recordable), BD (Blu-Ray Disc (trademark)) and the like.

The display control unit 130 generates a display screen indicating services to be provided and displays the same on the display unit 14. For example, the display control unit 130 may generate the display screen containing the title of the content data to be currently transmitted as shown in FIG. 1. The content data to be transmitted may be determined on the basis of a user's operation on the content server 10 or the cell phone 20. The display unit 14 may be a liquid crystal display (LCD) or OLED (Organic Light Emitting Display), for example.

The selection unit 134 selects data to be transmitted to the cell phone 20 on the basis of an approaching time between the content server 10 and the cell phone 20 evaluated by the approach detection unit 114. For example, the selection unit 134 determines whether the time evaluated by the approach detection unit 114 is longer than the predetermined time. Then, the selection unit 134 selects the sell data of the content data displayed on the display unit 14 for transmission when the time evaluated by the approach detection unit 114 is longer than the predetermined time, and selects the view data for transmission when the evaluated time is shorter.

More strictly, the selection unit 134 does not need to make a determination in a time region, and may determine whether the number of times of ACK reception, which has been counted by the approach detection unit 114, is more than the predetermined number of times. Then, the selection unit 134 may select the sell data of the content data displayed on the display unit 14 for transmission when the number of times of ACK reception is more than the predetermined number of times, and may select the view data for transmission when the number of times is less than that.

The timer 138 starts to count up a timer value when the separation between the cell phone 20 and the content server 10 is detected by the approach detection unit 114, and measures a time until the cell phone 20 and the content server 10 approach each other again. When the time measured by the timer 138 is within a setting time and the apparatuses which have established a connection most recently approach each other again, the electric field communication control unit 110 transmits the data selected by the selection unit 134 from the electric field coupler C.

The method for measuring a time until the cell phone 20 and the content server 10 approach each other again is not limited to the above example using the timer 138. For example, when the content server 10 and the cell phone 20 are separated from each other, the connection between the content server 10 and the cell phone 20 is terminated and the content server starts to transmit a connection establishment request. In this case, the content server 10 may not receive a response to the connection establishment request until the cell phone 20 approaches again, and can receive a response to the connection establishment request when the cell phone 20 approaches again. Thus, when periodically transmitting the connection establishment request, the content server 10 can utilize the number of times the content server 10 transmits the connection establishment request until it receives a response from the cell phone 20 as the time until the cell phone 20 and the content server 10 approach each other again.

(1-3) Operation of First Embodiment

There has been described above the structure of the content server according to the present embodiment with reference to FIG. 2. Subsequently, an operation example of the communication system 1 according to the present embodiment will be described with reference to FIGS. 3 to 5.

First Example

Figure 3:
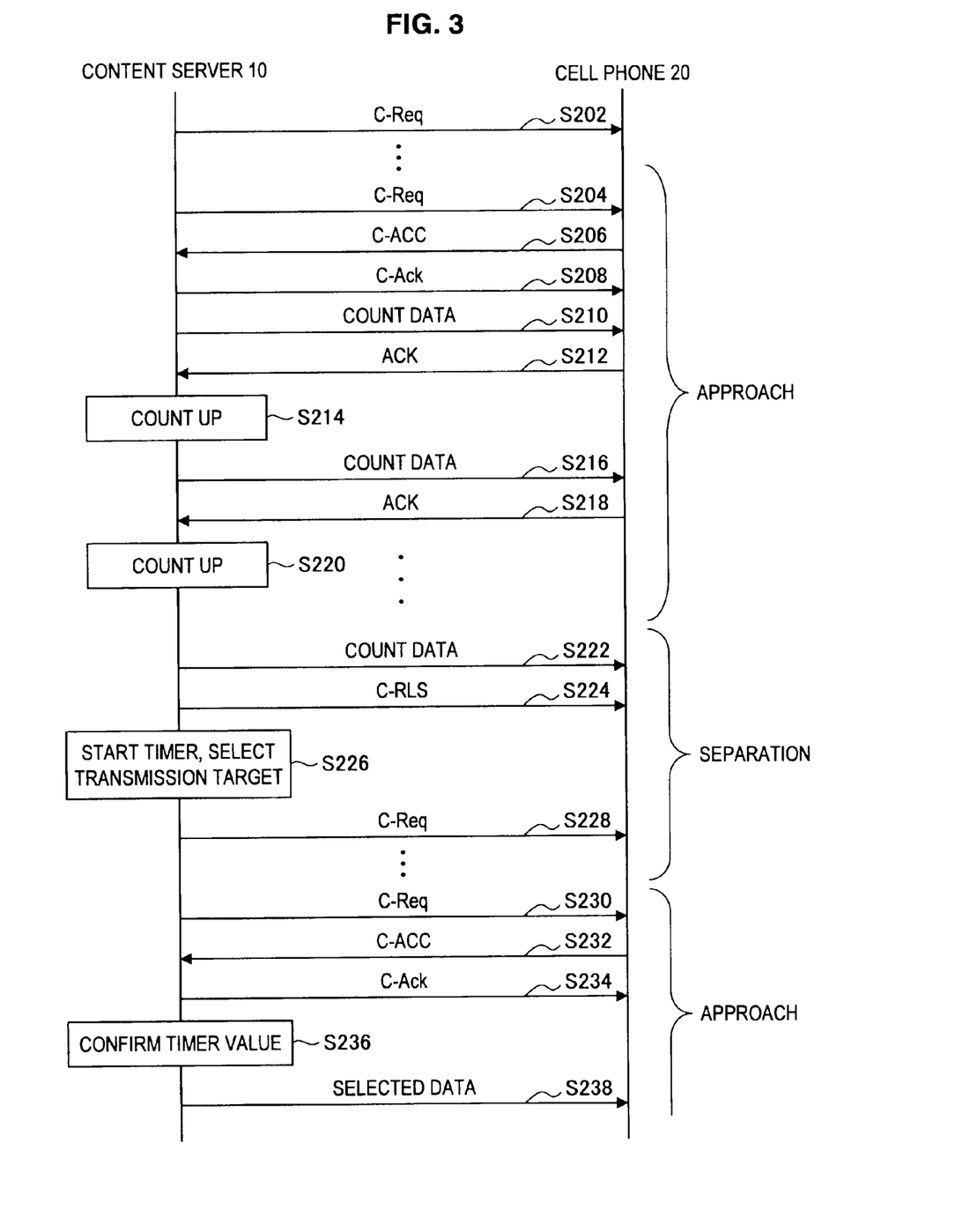
FIG. 3 is a sequence diagram showing a flow of an operation of a communication system according to the first embodiment.

FIG. 3 is a sequence diagram showing a flow of the operation of the communication system 1 according to the first embodiment. FIG. 3 shows an example in which the content server 10 functions as an initiator and the cell phone 20 functions as a responder, but the content server 10 may function as a responder and the cell phone 20 may function as an initiator. It can be similarly applied to FIGS. 4 and 5.

At first, as shown in FIG. 3, the electric field coupler C of the content server 10 repeats the transmission of a connection establishment request (C-Req) until the cell phone 20 approaches (S202). Then, when the content server 10 and the cell phone 20 approach each other and the cell phone 20 receives the connection establishment request transmitted from the electric field coupler C of the content server 10 (S204), the cell phone 20 transmits a response (C-ACC) to the connection establishment request (S206). Further, the electric field coupler C of the content server 10 transmits a confirmation signal (C-Ack) for the response (C-ACC) under control of the electric field communication control unit 110 so that the connection between the content server 10 and the cell phone 20 is established (S208).

Then, when the connection between the content server 10 and the cell phone 20 is established, the approach detection unit 114 of the content server 10 transmits the count data taking a predetermined transmission time from the electric field coupler C (S210). Thereafter, when receiving ACK for the count data from the cell phone 20 (S212), the approach detection unit 114 counts up the number of times of ACK reception (S214). Similarly, when transmitting the count data from the electric field coupler C (S216) and receiving ACK for the count data from the cell phone 20 (S218), the approach detection unit 114 counts up the number of times of ACK reception (S220).

Thereafter, when the content server 10 and the cell phone 20 are separated from each other and the response to the count data disappears (S222), the electric field communication control unit 110 transmits a connection release (C-RLS) indicating the end of the communication from the electric field coupler C (S224). Further, the timer 138 starts to count the timer value and the selection unit 134 selects the data to be transmitted on the basis of the number of times of ACK reception counted by the approach detection unit 114 (S226). For example, the selection unit 134 may select the sell data when the number of times of ACK reception is 5 or more times, and may select the view data when the number of times is less than 5 times.

Subsequently, the electric field coupler C of the content server 10 repeats the transmission of the connection establishment request (C-Req) until the cell phone 20 approaches again (S228). Then, when the content server 10 and the cell phone 20 approach each other again and the cell phone 20 receives the connection establishment request transmitted from the electric field coupler C of the content server 10 (S230), the cell phone 20 transmits a response (C-ACC) to the connection establishment request (S232). The electric field coupler C of the content server 10 transmits a confirmation signal (C-Ack) for the response (C-ACC) under control of the electric field communication control unit 110 so that the connection between the content server 10 and the cell phone 20 is reestablished (S234).

Subsequently, the approach detection unit 114 confirms the timer value (S236). Then, the approach detection unit 114 transmits the data selected by the selection unit 134 from the electric field coupler C when the timer value is within a setting time (for example, 10 seconds, 30 seconds or the like) and the approached cell phone 20 is the same as the apparatus which has established a connection most recently (S238). The response (C-ACC) contains identification information of the transmission source apparatus and the approach detection unit 114 can determine the identity of the apparatus on the basis of the identification information.

Second Example

There has been described above the example in which the content server 10 transmits the count data, but the cell phone 20 may transmit the count data as described below with reference to FIG. 4.

Figure 4:
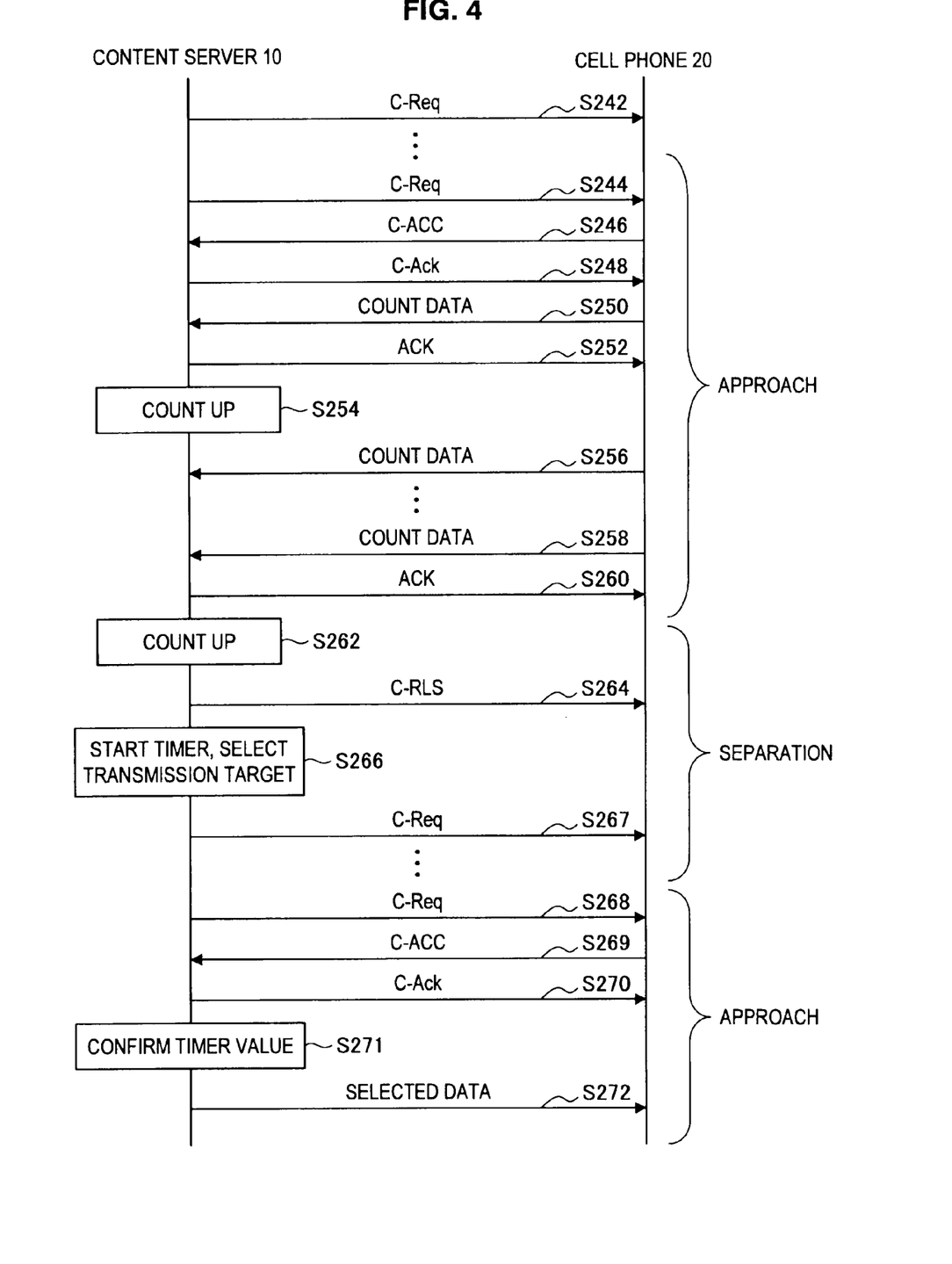
FIG. 4 is a sequence diagram showing a variant of the operation of the communication system according to the first embodiment.

FIG. 4 is a sequence diagram showing a variant of the operation of the communication system 1 according to the first embodiment. At first, as shown in FIG. 4, the electric field coupler C of the content server 10 repeats the transmission of a connection establishment request (C-Req) until the cell phone 20 approaches (S242). Then, when the content server 10 and the cell phone 20 approach each other and the cell phone 20 receives the connection establishment request transmitted from the electric field coupler C of the content server 10 (S244), the cell phone 20 transmits a response (C-ACC) to the connection establishment request (S246). Further, the electric field coupler C of the content server 10 transmits a confirmation signal (C-Ack) for the response (C-ACC) under control of the electric field communication control unit 110 so that the connection between the content server 10 and the cell phone 20 is established (S248).

When the connection between the content server 10 and the cell phone 20 is established, the cell phone 20 transmits the count data taking a predetermined transmission time from the electric field coupler C inside the cell phone 20 (S250). When the content server 10 receives the count data, the electric field communication control unit 110 returns ACK (S252) and the approach detection unit 114 counts up the number of times of reception of the count data (S254). Further, the cell phone 20 repeats the transmission of the count data (S256, S258), the electric field communication control unit 110 of the content server 10 returns ACK (S260), and the approach detection unit 114 counts up the number of times of reception of the count data (S262).

Thereafter, when the content server 10 and the cell phone 20 are separated from each other and the reception of the count data is absent in the content server 10, the electric field communication control unit 110 transmits a connection release (C-RLS) indicating the end of the communication from the electric field coupler C (S264). Further, the timer 138 starts to count the timer value and the selection unit 134 selects the data to be transmitted on the basis of the number of times of reception of the count data counted by the approach detection unit 114 (S266). For example, the selection unit 134 may select the sell data when the number of times of reception of the count data is five or more times, and may select the view data when the number of times is less than five times.

Subsequently, the electric field coupler C of the content server 10 repeats the transmission of the connection establishment request (C-Req) until the cell phone 20 approaches again (S267). Then, when the content server 10 and the cell phone 20 approach each other again and the cell phone 20 receives the connection establishment request transmitted from the electric field coupler C of the content server 10 (S268), the cell phone 20 transmits a response (C-ACC) to the connection establishment request (S269). Further, the electric field coupler C of the content server 10 transmits a confirmation signal (C-Ack) for the response (C-ACC) under control of the electric field communication control unit 110 so that the connection between the content server 10 and the cell phone 20 is reestablished (S270).

Subsequently, the approach detection unit 114 confirms the timer value (S271). Then, when the timer value is within the setting time (for example, 10 seconds, 30 seconds or the like) and the approached cell phone 20 is the same as the apparatus which has established a connection most recently, the approach detection unit 114 transmits the data selected by the selection unit 134 from the electric field coupler C (S272).

Third Example

There has been described above the example in which the content server 10 transmits the data selected by the selection unit 134 from the electric field coupler C when approaching the cell phone 20 again, but the content server 10 may transmit the data selected by the selection unit 134 via a wireless LAN as described below with reference to FIG. 5.

Figure 5:
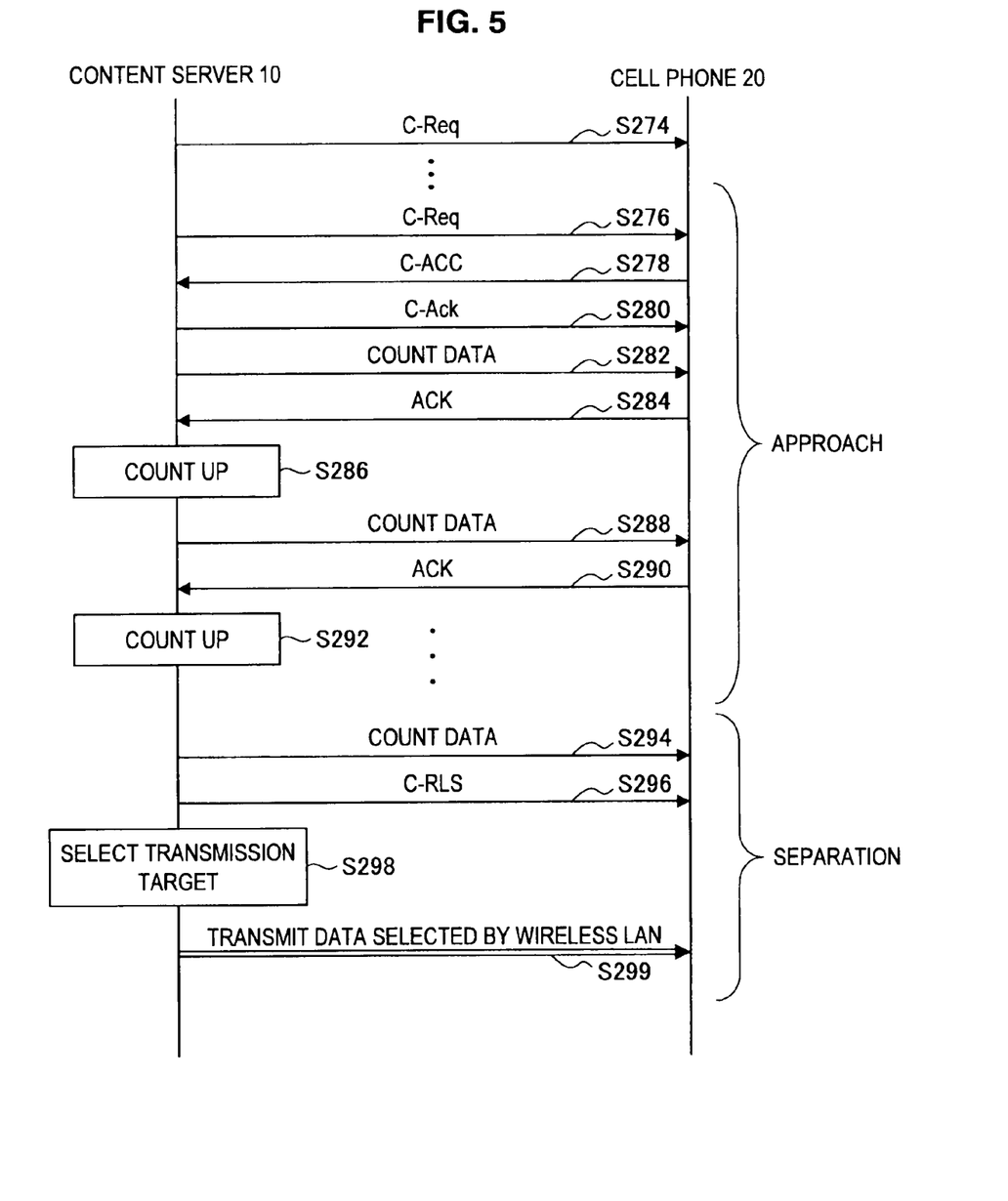
FIG. 5 is a sequence diagram showing a variant of the operation of the communication system according to the first embodiment.

FIG. 5 is a sequence diagram showing a variant of the operation of the communication system 1 according to the first embodiment. At first, as shown in FIG. 5, the electric field coupler C of the content server 10 repeats the transmission of a connection establishment request (C-Req) until the cell phone 20 approaches (S274). Then, when the content server 10 and the cell phone 20 approach each other and the cell phone 20 receives the connection establishment request transmitted from the electric field coupler C of the content server 10 (S276), the cell phone 20 transmits a response (C-ACC) to the connection establishment request (S278). The electric field coupler C of the content server 10 transmits a confirmation signal (C-Ack) for the response (C-ACC) under control of the electric field communication control unit 110 so that the connection between the content server 10 and the cell phone 20 is established (S280).

Then, the connection between the content server 10 and the cell phone 20 is established and the approach detection unit 114 of the content server 10 transmits the count data taking a predetermined transmission time from the electric field coupler C (S282). Thereafter, when receiving ACK for the count data from the cell phone 20 (S284), the approach detection unit 114 counts up the number of times of ACK reception (S286). Similarly, when transmitting the count data from the electric field coupler C (S288) and receiving ACK for the count data from the cell phone 20 (S290), the approach detection unit 114 counts up the number of times of ACK reception (S292).

Thereafter, when the content server 10 and the cell phone 20 are separated from each other and the response to the count data is absent (S294), the electric field communication control unit 110 transmits a connection release (C-RLS) indicating the end of the communication from the electric field coupler C (S296). The selection unit 134 selects the data to be transmitted on the basis of the number of times of ACK reception counted by the approach detection unit 114 (S298). For example, the selection unit 134 may select the sell data when the number of times of ACK reception is five or more times, and may select the view data when the number of times is less than five times. The wireless LAN control unit 122 transmits the data selected by the selection unit 134 from the antenna 118 to the cell phone 20 (S299). Address information on the wireless LAN of the cell phone 20 may be contained in the response (C-ACC) and the wireless LAN control unit 122 may transmit the data to the cell phone 20 on the basis of the address information.

Summary of First Embodiment

As described above, the content server 10 according to the first embodiment of the present invention can select the data to be transmitted depending on the time for which it is in close proximity to the cell phone 20. The function can be realized without the need of providing an acceleration sensor or gyro sensor, and advantageously has high convenience for users.

There has been described above the example in which the content server 10 selects either the sell data or the view data depending on the time for which it is in close proximity to the cell phone 20, but the present embodiment is not limited to the example. For example, the content server 10 may select contents, bit rate or file format to be transmitted depending on the time for which it is in close proximity to the cell phone 20.

(2) Second Embodiment

A communication system 2 according to a second embodiment of the present invention will be described below with reference to FIGS. 6 to 8.

Figure 6:
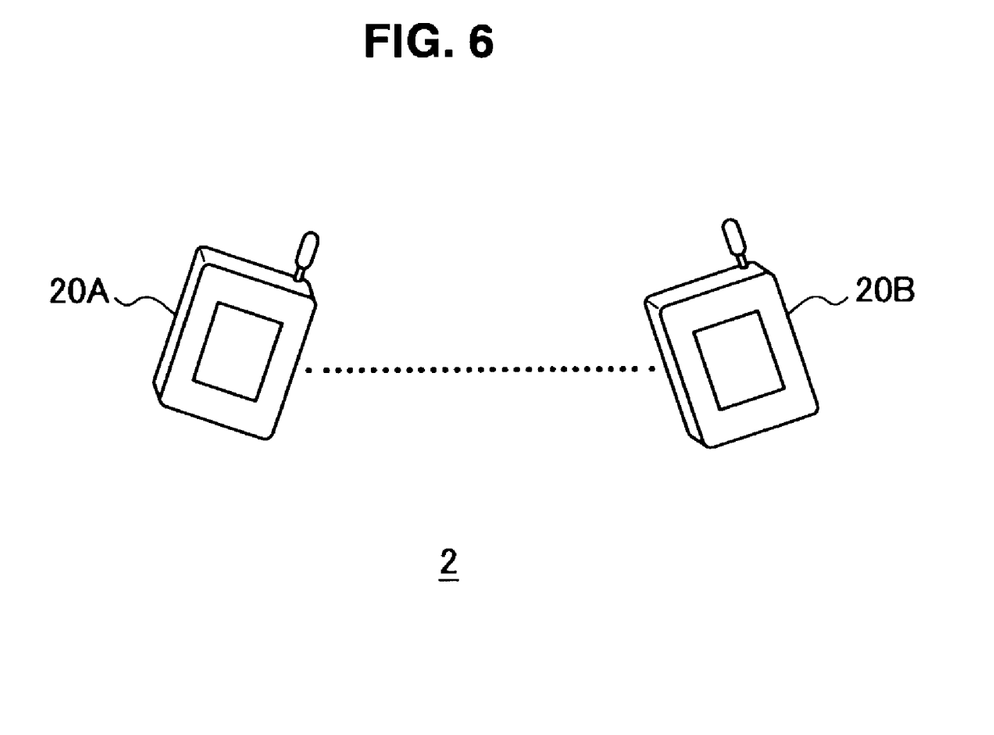
FIG. 6 is an explanatory diagram showing a communication system according to a second embodiment.

FIG. 6 is an explanatory diagram showing the communication system 2 according to the second embodiment of the present invention. As shown in FIG. 6, the communication system 2 according to the present embodiment includes a cell phone 20A and a cell phone 20B. In the following, each of a plurality of constituents having substantially the same function is discriminated by a different alphabet added to the same reference number. However, when each of the constituents having the same function does not need to be discriminated, only the same reference number is denoted. For example, when the cell phone 20A and the cell phone 20B do not need to be discriminated from each other, they are collectively denoted as the cell phone 20 simply.

The cell phone 20 stores therein content data and can reproduce the stored content data. The cell phones 20 include an electrode plate called electric field coupler capable of electric field coupling with each other. For example, when both the electric field couplers of the cell phones 20A and 20B approach each other within 3 cm, a change in an inductive field generated by one electric field coupler is sensed by the other electric field coupler, thereby realizing an electric field communication between the cell phones 20A and 20B.

For example, a transfer of content data is performed through the electric field communication between such cell phones 20A and 20B. However, on the transfer, it was complicated that one user expresses his/her intention to transfer certain content data to the other user and then selects a communication mode to select a necessary file. To the contrary, according to the present embodiment, it is possible to specify and transfer the content data to be transmitted more easily. In the following, the present embodiment will be described in detail.

FIG. 6 merely shows the cell phones 20A and 20B as one example of the communication apparatus, and the present invention is not limited to the example. For example, the communication apparatus may be an information processing apparatus such as PC, home video processing device, PHS, portable music player, portable video processing device, PDA, home game device, portable game device or household electrical appliance.

Figure 7:
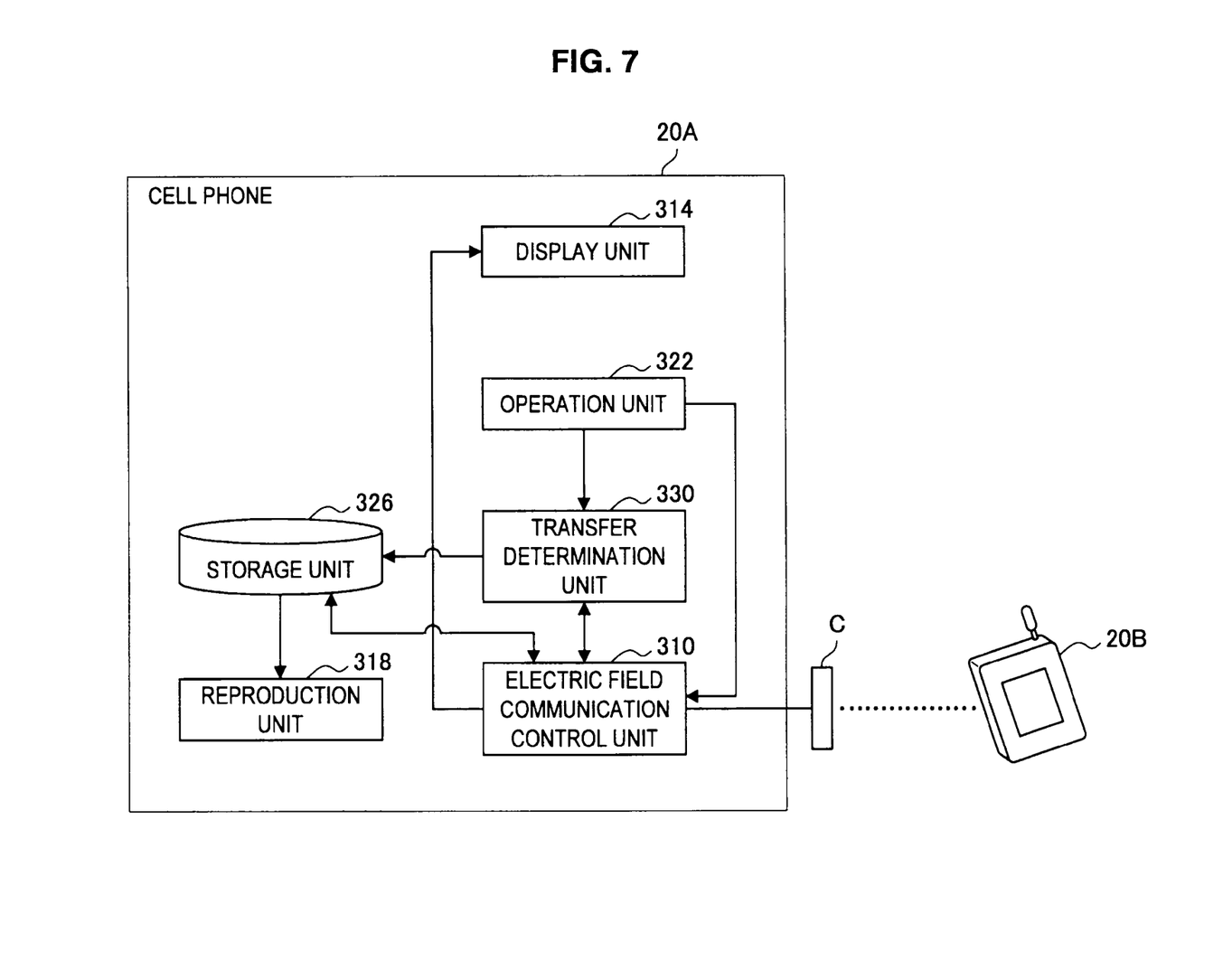
FIG. 7 is a functional block diagram showing a structure of a cell phone according to the second embodiment.

FIG. 7 is a function block diagram showing a structure of the cell phone 20A according to the second embodiment. As shown in FIG. 7, the cell phone 20A includes an electric field coupler C, an electric field communication control unit 310, a display unit 314, a reproduction unit 318, an operation unit 322, a storage unit 326 and a transfer determination unit 330.

The electric field communication control unit 310 entirely controls the electric field communication between the electric field coupler C and the cell phone 20B. For example, the electric field communication control unit 310 generates and converts connection data for the connection establishment processing into a signal form transmittable from the electric field coupler C. The electric field communication control unit 310 converts predetermined data into a signal form transmittable from the electric field coupler C. Further, the electric field communication control unit 310 performs a decode processing on the data received by the electric field coupler C. For example, the electric field communication control unit 310 may down-convert the data received by the electric field coupler C as a high frequency signal into a baseband signal and obtain a bit string based on a constellation.

The storage unit 326 stores therein one or more items of content data. The storage unit 326 may be a recording medium such as non-volatile memory, magnetic disk, optical disk and MO (Magneto Optical) disk.

The reproduction unit 318 reproduces the content data stored in the storage unit 326. For example, when the content data is music data, the reproduction unit 318 decodes the content data stored in the storage unit 326 and converts the same into aerial vibration for outputting as speech.

When the electric field coupler C and the cell phone 20B approach each other while the reproduction unit 318 is reproducing the content data, the display unit 314 displays a confirmation screen which asks the user whether to transfer the content data being reproduced to the cell phone 20B. When the cell phone 20B grasps that the content data is being reproduced in the cell phone 20A through the electric field communication with the cell phone 20A, it displays the confirmation screen which asks the user whether to request the content data transfer. More specifically, the cell phone 20B may receive file information on the content data being reproduced in the cell phone 20A and may contain the title or time of the content data being reproduced in the confirmation screen.

The operation unit 322 is an interface with a user and is input with various items of information or various instructions by the user. For example, the user operates the operation unit 322 to select whether to transfer the content data being reproduced on the confirmation screen displayed on the display unit 314. When whether to request the content data transfer is selected on the confirmation screen displayed on the cell phone 20B, the selection result is transmitted from the cell phone 20B to the cell phone 20A.

The transfer determination unit 330 determines whether to transfer the content data being reproduced in the reproduction unit 318 on the basis of the user operation on the operation unit 322 and the selection result transmitted from the cell phone 20B. For example, when the cell phone 20A selects the transfer and the cell phone 20B selects the transfer request, the transfer determination unit 330 determines to transfer the content data being reproduced in the reproduction unit 318.

When the transfer determination unit 330 determines to transfer the content data, the electric field communication control unit 310 transmits the content data being reproduced in the reproduction unit 318 from the electric field coupler C. The content data to be transmitted may be a download form or streaming form.

Subsequently, an operation of the cell phone 20 according to the present embodiment will be described with reference to FIG. 8.

Figure 8:
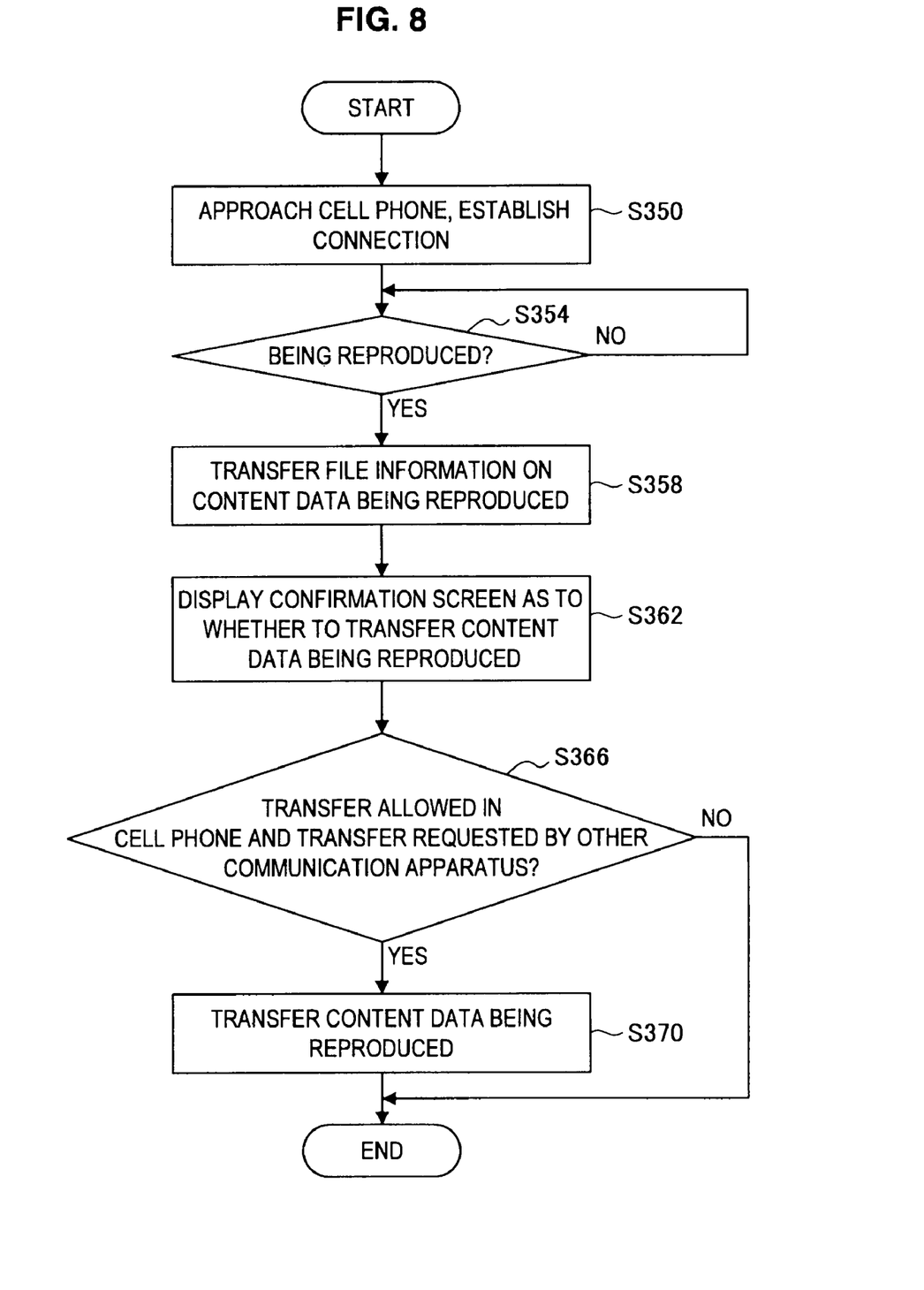
FIG. 8 is a flowchart showing a flow of an operation of the cell phone according to the second embodiment.

FIG. 8 is a flowchart showing a flow of the operation of the cell phone 20 according to the second embodiment. At first, as shown in FIG. 8, when being approached by the other communication apparatus, the cell phone 20 establishes a connection with the other communication apparatus (S350). Then, if the content data is being reproduced in the reproduction unit 318 of the cell phone 20 (S354), the electric field communication control unit 310 transmits file information on the content data from the electric field coupler C to the other communication apparatus (S358).

The display unit 314 displays the confirmation screen which asks the user whether to transfer the content data being reproduced (S362). When the transfer is allowed in the cell phone 20 and the content data transfer request is made by the other communication apparatus, the transfer determination unit 330 determines to transfer the content data (S366). The electric field communication control unit 310 transfers the content data according to the determination (S370).

As described above, according to the present embodiment, the content data being reproduced can be transmitted. Thus, it saves a time to select the content data to be transmitted, thereby improving user convenience.

(3) Third Embodiment

A communication system 3 according to a third embodiment of the present invention will be described below with reference to FIGS. 9 and 10.

Figure 9:
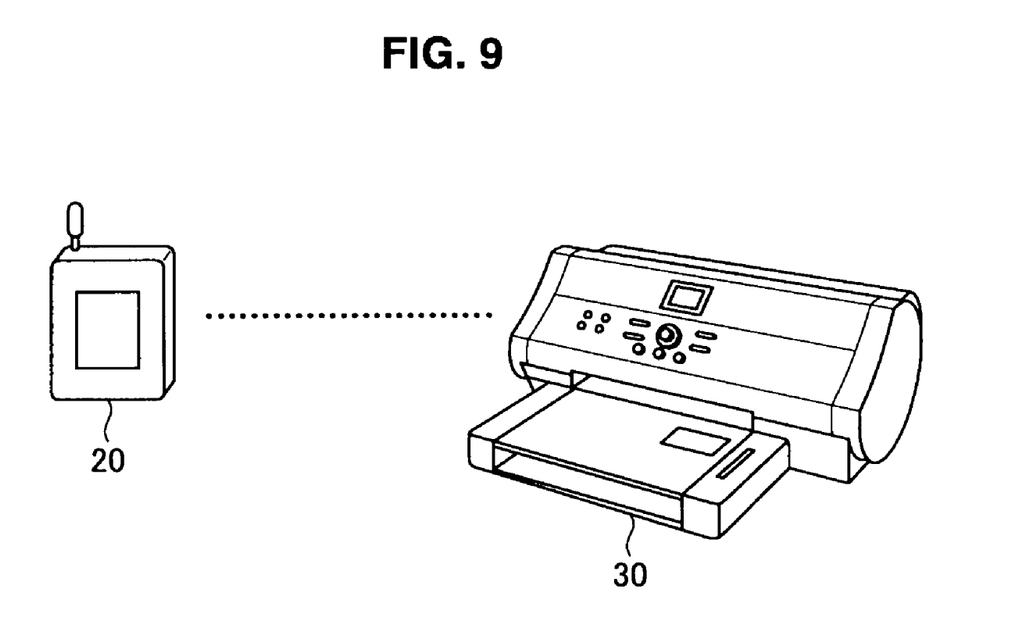
FIG. 9 is an explanatory diagram showing a communication system 3 according to a third embodiment.

FIG. 9 is an explanatory diagram showing the communication system 3 according to the third embodiment of the present invention. As shown in FIG. 9, the communication system 3 according to the present embodiment includes the cell phone 20 and a print device 30.

The cell phone 20 can be configured to have substantially the same structure as that described in the second embodiment. In the present embodiment, there will be described with emphasis an example in which the reproduction unit 318 reproduces photograph data as content data. There is assumed in the present embodiment such that the cell phone 20 transmits the photograph data being reproduced to the print device 30 without depending on a particular determination by the transfer determination unit 330.

The print device 30 includes an electric field coupler and can make electric field communication with the cell phone 20. The print device 30 visually prints out externally-input photograph data on a printing medium such as sheet.

For example, when being connected to a memory storing therein the photograph data, the print device 30 reads out the photograph data stored in the memory and prints out the user-selected photograph data. However, in this case, since the photograph data not to be printed is also read out from the memory, there was an issue it took much time to read out the photograph data. Further, there can occur that the photograph data in the memory is lost due to some issues. The communication apparatus 3 according to the present embodiment can solve the issues and realize smoother printing as shown in FIG. 10.

Figure 10:
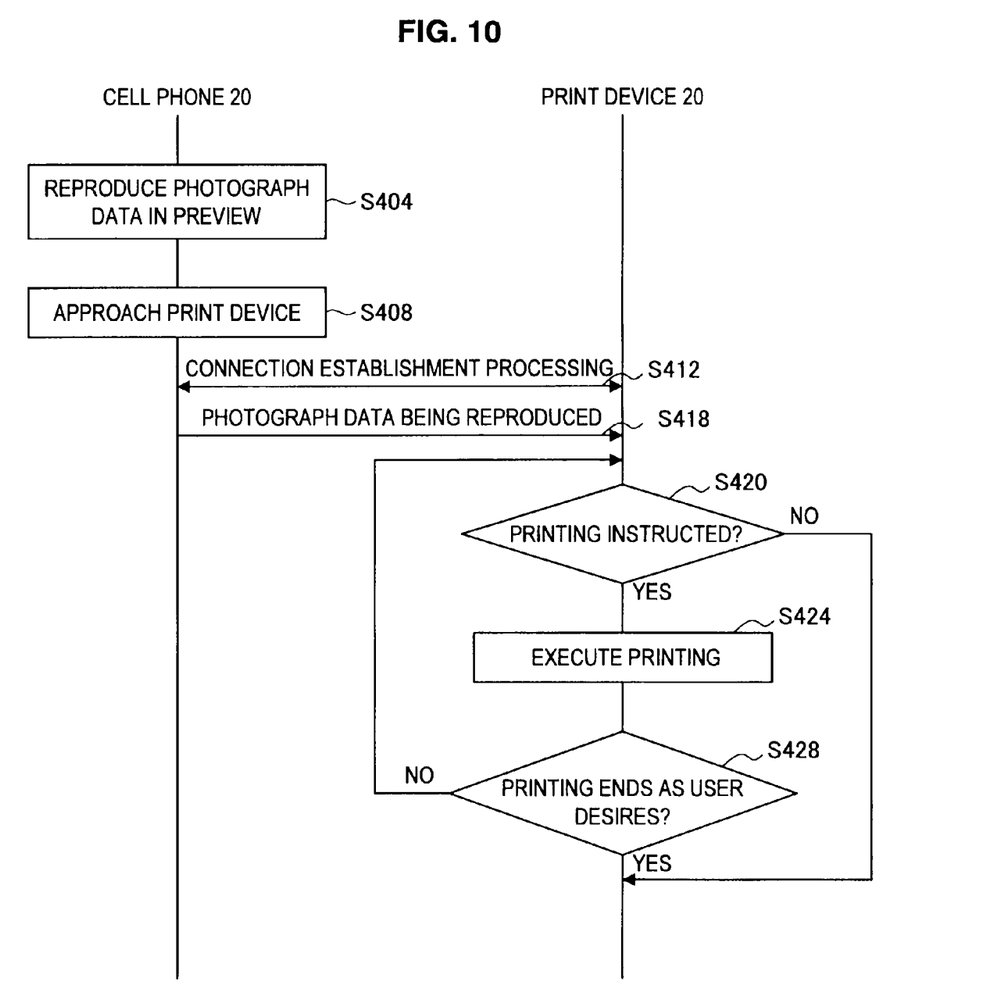
FIG. 10 is a sequence diagram showing a flow of an operation of the communication system according to the third embodiment.

FIG. 10 is a sequence diagram showing a flow of the operation of the communication system 3 according to the third embodiment. At first, as shown in FIG. 10, the reproduction unit 318 of the cell phone 20 reproduces one or more items of photograph data stored in the storage unit 326 in preview (S404). Thereafter, when the cell phone 20 and the print device 30 approach each other (S408), the cell phone 20 and the print device 30 perform the connection establishment processing through electric field communication (S412).

Then, when the connection establishment processing is terminated, the electric field communication control unit 310 of the cell phone 20 transmits one or more items of photograph data being reproduced in preview from the electric field coupler C to the print device 30 (S416). When receiving one or more items of photograph data from the cell phone 20, the print device 30 displays the photograph data and a screen for asking the user whether to print out the photograph data. When being instructed to print by the user (S420), the print device 30 performs printing (S424) and confirms whether the printing has been performed as the user desired (S428). The print device 30 may perform printing at the number and size of sheets designated by the user. Further, when the print device 30 includes a plurality of electric field couplers, the designation can be performed by causing the cell phone 20 to approach any electric field coupler.

[4] Supplement

It should be understood by those skilled in the art that various modifications, combinations, sub-combinations and alterations may occur depending on design requirements and other factors insofar as they are within the scope of the appended claims or the equivalents thereof.

For example, each step in the processings of the communication system and the cell phone 20 in the present specification does not necessarily need to be processed in time line in the order described in the sequence diagrams or flowchart. For example, each step in the processings of the communication system and the cell phone 20 may include a processing performed in parallel or individually (such as parallel processing or object processing).

Further, there can be created a computer program for causing hardware such as CPU, ROM and RAM incorporated in the content server 10, the cell phone 20 and the print device 30 to exhibit similar function as each configuration of the content server 10, the cell phone 20 and the print device 30 described above. A storage medium storing therein the computer program is also provided. The respective function blocks illustrated in the functional block diagrams of FIGS. 2 and 7 are configured in hardware, thereby realizing a series of processing in hardware.

The present application contains subject matter related to that disclosed in Japanese Priority Patent Application JP 2008-215844 filed in the Japan Patent Office on Aug. 25, 2008, the entire content of which is hereby incorporated by reference.

What is claimed is:

1. A communication apparatus comprising:
 a first communication unit for communicating with other communication apparatus through electric field coupling or magnetic field coupling;
 an approach detection unit for detecting an approach between the other communication apparatus and the first communication unit; and
 a selection unit for, when the other communication apparatus and the first communication unit are separated from each other, selecting different data to be transmitted depending on a time for which the other communication apparatus and the first communication unit were in close proximity to each other, when the selection unit determines the time is less than a predetermined time, the selection unit selects first data to be transmitted, and when the selection unit determines the time is greater than the predetermined time, the selection unit selects different second data second data to be transmitted.

2. The communication apparatus according to claim 1, wherein the selection unit selects first data to be transmitted when a time for which the other communication apparatus and the first communication unit were in close proximity to each other is shorter than a setting time, and
 selects second data partially containing the first data to be transmitted when the time for which the other communication apparatus and the first communication unit were in close proximity to each other is longer than the setting time.

3. The communication apparatus according to claim 2, wherein the first communication unit periodically transmits a signal, and when the other communication apparatus and the first communication unit were in close proximity to each other, receives a response to the signal from the other communication apparatus,
 the approach detection unit counts the number of times the first communication unit continuously receives the response, and
 the selection unit selects data depending on the number of times counted by the approach detection unit.

4. The communication apparatus according to claim 2, wherein the first communication unit receives a signal periodically transmitted from the other communication apparatus, the approach detection unit counts the number of times the first communication unit continuously receives the response, and the selection unit selects data depending on the number of times counted by the approach detection unit.

5. The communication apparatus according to claim 1, wherein when the other communication apparatus and the first communication unit approach each other again after the other communication apparatus and the first communication unit are separated from each other and when a time for which the other communication apparatus and the first communication unit are being separated from each other is within a predetermined time, the first communication unit transmits the data selected by the selection unit.

6. The communication apparatus according to claim 1, further comprising a second communication unit, wherein the data selected by the selection unit is transmitted from the second communication unit.

7. A non-transitory computer storage medium having program instructions stored thereon that when executed by a computer cause the computer to function as:

a communication unit for communicating with other communication apparatus through electric field coupling or magnetic field coupling;

an approach detection unit for detecting an approach between the other communication apparatus and the communication unit; and a selection unit for, when the other communication apparatus and the communication unit are separated from each other, selecting different data to be transmitted depending on a time for which the other communication apparatus and the communication unit were in close proximity to each other, when the selection unit determines the time is less than a predetermined time, the selection unit selects first data to be transmitted, and when the selection unit determines the time is greater than the predetermined time, the selection unit selects different second data second data to be transmitted.

8. A communication method comprising the steps of:

detecting an approach with other communication apparatus communicating through electric field coupling or magnetic field coupling;

detecting a separation from the other communication apparatus; and selecting different data to be transmitted depending on a time for which the other communication apparatus is in close proximity, wherein when the selecting determines the time is less than a predetermined time, the selecting selects first data to be transmitted, and when the time is greater than the predetermined time, the selecting selects different second data to be transmitted.

9. A communication system comprising:

a first communication apparatus; and a second communication apparatus having:

a communication unit for communicating with the first communication apparatus through electric field coupling or magnetic field coupling;

an approach detection unit for detecting an approach between the first communication apparatus and the communication unit; and a selection unit for, when the first communication apparatus and the communication unit are separated from each other, selecting different data to be transmitted depending on a time for which the first communication apparatus and the communication unit were in close proximity to each other, when the selection unit determines the time is less than a predetermined time, the selection unit selects first data to be transmitted, and when the selection unit determines the time is greater than the predetermined time, the selection unit selects different second data second data to be transmitted.

* * * * *